(12) United States Patent
Wu

(10) Patent No.: US 11,489,651 B2
(45) Date of Patent: Nov. 1, 2022

(54) FREQUENCY BAND STATE PROCESSING METHOD AND FREQUENCY BAND STATE PROCESSING DEVICE

(71) Applicant: VIVO MOBILE COMMUNICATION CO., LTD., Chang'an Dongguan (CN)

(72) Inventor: Yumin Wu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 79 days.

(21) Appl. No.: 16/637,999

(22) PCT Filed: Aug. 7, 2018

(86) PCT No.: PCT/CN2018/099139
§ 371 (c)(1),
(2) Date: Feb. 10, 2020

(87) PCT Pub. No.: WO2019/029516
PCT Pub. Date: Feb. 14, 2019

(65) Prior Publication Data
US 2020/0220700 A1   Jul. 9, 2020

(30) Foreign Application Priority Data

Aug. 11, 2017   (CN) .......................... 201710687866.8

(51) Int. Cl.
*H04L 5/00* (2006.01)
*H04B 7/12* (2006.01)
*H04W 72/04* (2009.01)

(52) U.S. Cl.
CPC ............. *H04L 5/0098* (2013.01); *H04B 7/12* (2013.01); *H04W 72/042* (2013.01); *H04W 72/0453* (2013.01)

(58) Field of Classification Search
CPC .................... H04L 5/0098; H04W 72/0453
See application file for complete search history.

(56) References Cited

U.S. PATENT DOCUMENTS

2616/0072574   3/2016   Xu et al.
2020/0404690 A1 *   12/2020   Lee .................... H04W 24/10
(Continued)

FOREIGN PATENT DOCUMENTS

CN   102355322 A   2/2012
EP   3570482 A1   11/2019
WO   WO 2018/063944 A1   4/2018

OTHER PUBLICATIONS

European Search Report Application No. 18843252.0; dated Aug. 3, 2020.
(Continued)

*Primary Examiner* — Ayaz R Sheikh
*Assistant Examiner* — Debebe A Asefa
(74) *Attorney, Agent, or Firm* — von Briesen & Roper, s.c.

(57) ABSTRACT

A frequency-band state processing method and device are provided. The frequency-band state processing method at a UE side includes: receiving, by a UE, control signaling sent by a network device; wherein the control signaling includes at least one BWP identifier and a state configuration indication, and the state configuration indication includes an activation indication or a deactivation indication; configuring, by the UE according to the state configuration indication, a BWP state of a BWP corresponding to the BWP identifier included in the control signaling.

20 Claims, 6 Drawing Sheets

(56) References Cited

U.S. PATENT DOCUMENTS

2021/0037505 A1* 2/2021 Kim .................. H04L 1/0002
2021/0092008 A1* 3/2021 Yi .................... H04L 5/0005

OTHER PUBLICATIONS

International Search Report & Written Opinion related to Application No. PCT/CN2018/099139; dated Oct. 10, 2018.
ZTE; "Resource allocation for wideband operation", 3GPP TSG RAN WG1 NR Ad-Hoc#2, R1-1710126, Qingdao, P.R. China, Jun. 27, 2017-Jun. 30, 2017.
Huawei, Hisilicon; "On bandwidth adaptation", 3GPP TSG RAN WG1 NR Ad-Hoc Meeting, R1-1711424, Qingdao, China Jun. 27, 2017-Jun. 30, 2017.
Extended European Search Report for related Application No. 18843252.0; dated May 27, 2021.
"3rd Generation Partnership Project; Technical Specification Group Radio Access Network; NR; Physical channels and modulation (Release 15)", 3GPP TS 38.211, V15.2.0, Jun. 2018, pp. 1-96.
"3rd Generation Partnership Project; Technical Specification Group Radio Access Network; NR; Medium Access Control (MAC) protocol specification (Release 15)", 3GPP TS 38.321, V15.2.0, Jun. 2018, pp. 1-73.
WIPO "Document Made Available Under The Patent Cooperation Treat (PCT)" for related Application No. PCT/KR2018/007698.

* cited by examiner

FREQUENCY BAND STATE PROCESSING METHOD AND FREQUENCY BAND STATE PROCESSING DEVICE

CROSS-REFERENCE TO RELATED APPLICATION

This patent application is a 35 USC § 371 U.S. national stage of International Application No. PCT/CN2018/099139 filed on Aug. 7, 2018, which claims priority to a Chinese Patent Application No. 201710687866.8, filed in China on Aug. 11, 2017, the disclosure of which is incorporated herein by reference in its entirety.

TECHNICAL FIELD

The present disclosure relates to the field of wireless communication technology, and in particular, relates to a frequency-band state processing method and a frequency-band state processing device.

BACKGROUND

In a 5$^{th}$ Generation (5G) mobile communication system, a User Equipment (UE) probably only supports a relatively narrow operating bandwidth (such as 5 MHz), whereas a cell of a network device may support a relatively wide bandwidth (such as 100 MHz), the narrow bandwidth part, in which the UE operates, in the wide bandwidth is a Bandwidth Part (BWP).

For example, as shown in FIG. 1, assuming that a cell of a network device supports a frequency bandwidth of 100 MHz, then the frequency bandwidth of 100 MHz is divided into a plurality of frequency-band areas, and a single frequency-band area corresponds to a single BWP, such as BWP 1, BWP 2, BWP 3, and BWP 4.

However, in a case that a plurality of different BWPs are configured, the related art does not define how the UE chooses to use the plurality of different BWPs for information interaction with a base station. Thus, the UE cannot manage a BWP state of a BWP, which leads to a lower bandwidth utilization.

SUMMARY

The present disclosure provides a frequency-band state processing method and a frequency-band state processing device.

According to a first aspect of the present disclosure, a frequency-band state processing method is provided. The frequency-band state processing method includes: receiving, by a UE, control signaling sent by a network device; wherein the control signaling includes at least one BWP identifier and a state configuration indication, and the state configuration indication includes an activation indication or a deactivation indication; configuring, by the UE according to the state configuration indication, a BWP state of a BWP corresponding to the BWP identifier included in the control signaling.

According to a second aspect of the present disclosure, a frequency-band state processing method is provided. The frequency-band state processing method includes: generating, by a network device, control signaling, sending, by the network device, the control signaling to the UE. The control signaling includes at least one BWP identifier and a state configuration indication, the state configuration indication includes an activation indication or a deactivation indication, and the state configuration indication is used to indicate that a UE configures a BWP state of a BWP corresponding to the BWP identifier included in the control signaling.

According to a third aspect of the present disclosure, a UE is provided. The UE may include: a reception unit and a first configuration unit. The reception unit is used to receive a control signaling sent by a network device; wherein the control signaling includes at least one BWP identifier and a state configuration indication, and the state configuration indication includes an activation indication or a deactivation indication. The first configuration unit is used to configure, according to the state configuration indication included in the control signaling received by the reception unit, a BWP state of a BWP corresponding to the BWP identifier included in the control signaling.

According to a fourth aspect of the present disclosure, a network device is provided. The network device may include: a processing unit and a transmission unit. The processing unit is used to generate control signaling; wherein the control signaling includes at least one BWP identifier and a state configuration indication, the state configuration indication includes an activation indication or a deactivation indication, and the state configuration indication is used to indicate that a UE configures a BWP state of a BWP corresponding to the BWP identifier included in the control signaling. The transmission unit is used to send, to the UE, the control signaling generated by the processing unit.

According to a fifth aspect of the present disclosure, a UE is provided. The UE may include: a storage, a processor and a computer program stored in the storage and executable by the processor. In a case that the computer program is executed by the processor, the frequency-band state processing method according to the first aspect is implemented by the processor.

According to a sixth aspect of the present disclosure, a computer readable storage medium is provided. A computer program is stored in the computer readable storage medium, and in a case that the computer program is executed by the processor in the fifth aspect, the frequency-band state processing method according to the first aspect is implemented.

According to a seventh aspect of the present disclosure, a computer program product is provided. In a case that the computer program product is executed on a computer, the computer is caused to execute the frequency-band state processing method according to the first aspect.

According to an eight aspect of the present disclosure, a frequency-band state processing device is provided. The frequency-band state processing device exists in a form of a chip product. The frequency-band state processing device may include a processor, a storage, and a computer program stored in the storage and executable on the processor. In a case that the computer program is executed by the processor, the frequency-band state processing method according to the first aspect is implemented.

According to a ninth aspect of the present disclosure, a network device is provided. The network device may include: a storage, a processor and a computer program stored in the storage and executable by the processor. In a case that the computer program is executed by the processor, the frequency-band state processing method according to the second aspect is implemented.

According to a tenth aspect of the present disclosure, a computer readable storage medium is provided. A computer program is stored in the computer readable storage medium, and in a case that the computer program is executed by the processor in the ninth aspect, the frequency-band state processing method according to the second aspect is implemented.

According to an eleventh aspect of the present disclosure, a computer program product is provided. In a case that the computer program product is executed on a computer, the computer is caused to perform the frequency-band state processing method according to the second aspect.

According to a twelfth aspect of the present disclosure, a frequency-band state processing device is provided. The frequency-band state processing device exists in a form of a chip product. The frequency-band state processing device may include a processor, a storage, and a computer program stored in the storage and executable by the processor. In a case that the computer program is executed by the processor, the frequency-band state processing method according to the second aspect is implemented.

DETAILED DESCRIPTION

The frequency-band state processing method and the frequency-band state processing device provided by some embodiments of the present disclosure may be applied to a process of configuring a BWP state of a BWP, and specifically, may be applied to a process of activating or deactivating a BWP.

The frequency-band state processing method and the frequency-band state processing device provided by some embodiments of the present disclosure may flexibly manage a BWP state of a BWP in a case that the UE is configured with a plurality of different BWPs, thereby improving a gain of frequency diversity and further improving a bandwidth utilization rate.

The following explains some concepts involved in the frequency-band state processing method and the frequency-band state processing device provided by some embodiments of the present disclosure.

A BWP: a UE probably only supports a relatively narrow operating bandwidth (such as 5 MHz), whereas a cell of a network device may support a relatively wide bandwidth (such as 100 MHz), a narrow bandwidth part, in which the UE operates, of the wide bandwidth is the BWP.

A BWP state: a BWP is in an activated state or in a deactivated state.

A BWP type: a BWP is a Primary BWP (PBWP) or a Secondary BWP (SBWP).

Implementations of some embodiments of the present disclosure will be described in detail below with reference to the drawings.

Figure 1:
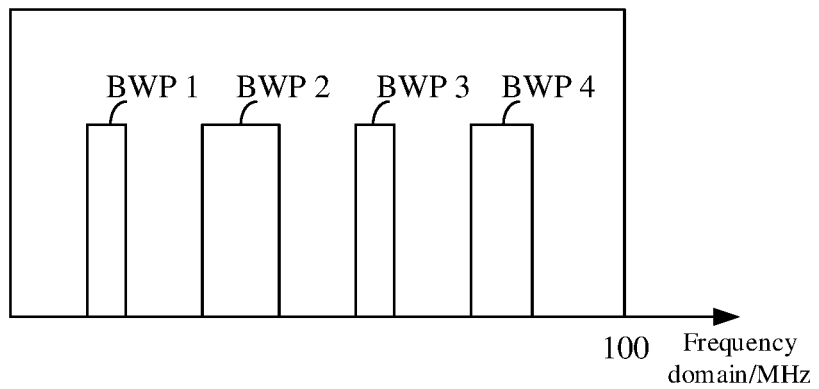
FIG. 1 is a schematic diagram of an example of a BWP provided by the related art.
Figure 2:
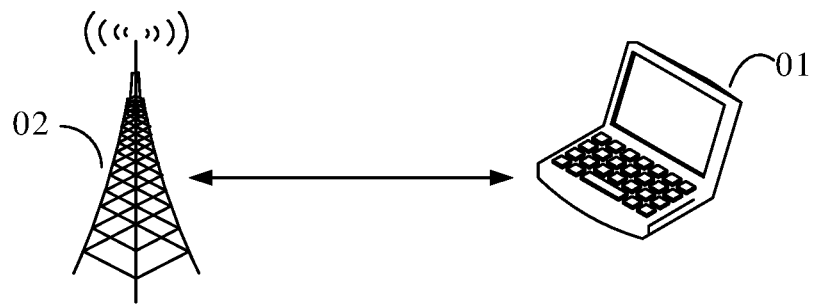
FIG. 2 is a schematic diagram illustrating an architecture of a system to which a frequency-band state processing method provided by some embodiments of the present disclosure is applied.

FIG. 2 is a schematic diagram illustrating an architecture of a system to which a frequency-band state processing method provided by some embodiments of the present disclosure is applied. As shown in FIG. 2, the architecture of the system may include a UE 01 and a network device (such as a base station 02). The UE 01 communicates with the base station 02.

The UE 01 may be a device that provides voice and/or data connectivity to a user, a handheld device having a wired/wireless connection function, or another processing device connected to a wireless modem. The UE 01 may communicate with one or more network devices via a Radio Access Network (RAN). The UE 01 may be a mobile terminal, such as a mobile phone (or referred to as "cellular" phone) and a computer having a mobile terminal, or may also be a portable mobile device, a pocket mobile device, a handheld mobile device, a computer built-in mobile device or an in-vehicle mobile device that exchanges language and/or data with RAN, for example, a Personal Communication Service (PCS) telephone, a cordless telephone, a Session Initiation Protocol (SIP) telephone, a Wireless Local Loop (WLL) station, a Personal Digital Assistant (PDA) or the like, some embodiments of the present disclosure are not limited in this respect.

Illustratively, the network device in some embodiments of the present disclosure may be a base station. The base station is a device deployed in a radio access network and used to provide a wireless communication function for the UE 01. The base station may include various forms of macro base stations, micro base stations, relay stations, access points, and so on. In systems using different radio access technologies, names of devices having a function of a base station may be different. For example, in a Long Term Evolution (LTE) system, a base station is called an evolved base station (evolved NodeB, eNB, or eNodeB). In a 3rd Generation Telecommunication (3G) system, the base station is called a Node B, and so on. As communication technology evolves, the name of a "base station" may vary.

Figure 3:
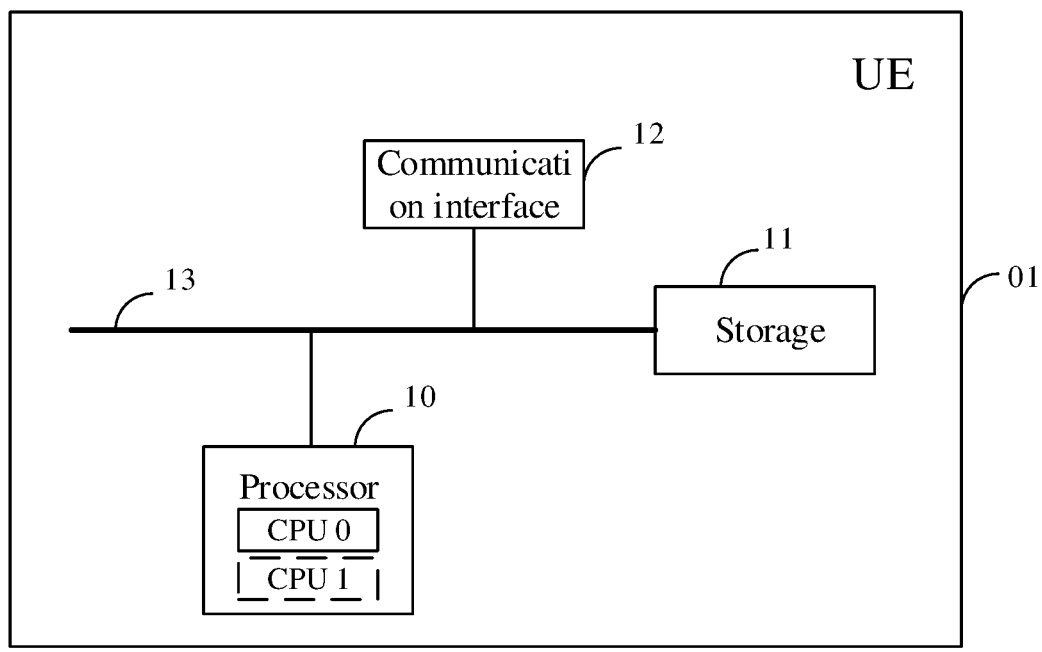
FIG. 3 is a first schematic diagram illustrating a structure of a UE provided by some embodiments of the present disclosure.

Some embodiments of the present disclosure provide a UE, and FIG. 3 is a schematic diagram illustrating a structure of a UE 01 provided by some embodiments of the present disclosure. As shown in FIG. 3, the UE 01 includes a processor 10, a storage 11, a communication interface 12, and a communication bus 13.

The following describes components of the UE 01 in detail with reference to FIG. 3.

The processor 10 is a control center of the UE 01, and may be a processor or a collective name of a plurality of processing components. For example, the processor 10 is a Central Processing Unit (CPU), or an Application Specific Integrated Circuit (ASIC), or one or more integrated circuits configured to implement some embodiments of the present disclosure, such as one or more Digital Signal Processors (DSPs), or one or more Field Programmable Gate Arrays (FPGAs). The processor 10 connects various parts of the entirety of the UE 01 by using various interfaces and lines. By running or executing software programs and/or modules stored in the storage 11 and calling data stored in the storage 11, various functions of the UE 01 are performed and data are processed, so that an overall monitoring of the UE 01 is performed.

Optionally, in a specific implementation, the processor 10 may include one or more CPUs, such as a CPU 0 and a CPU 1 shown in FIG. 3.

Optionally, in specific implementation, the UE 01 may include a plurality of processors, that is, the UE 01 may include a multi-core processor. Each of these processors may be a single-core processor (Single-CPU) or a multi-core processor (Multi-CPU). The processor herein may refer to one or more devices, circuits, and/or processing cores for processing data (such as computer program instructions).

The storage 11 may be used to store software programs and modules. The processor 10 executes various functions, applications of the UE 01 and processes data of the UE 01 by running software programs and modules stored in the storage 11. The storage 11 may mainly include a storage program region and a storage data region, wherein the storage program region may store an operating system, an application program required for at least one function, and the like; the storage data region may store data created based on use of the UE 01 and the like. In addition, the storage 11 may be a Read-Only Memory (ROM) or another type of static storage device capable of storing static information and instructions, a Random Access Memory (RAM), or other types of dynamic storage devices capable of storing static information and instructions, or Electrically Erasable Programmable Read-Only Memory (EEPROM), Compact Disc Read-Only Memory (CD-ROM) or other optical disk storages, optical disc storage (including compact discs, laser discs, optical discs, digital versatile discs, Blu-ray discs, etc.), magnetic disk storage medium or other magnetic storage devices, or any other medium that can be used to carry or store desired program codes in forms of instructions or data structures and can be accessed by a computer, but is not limited to these.

The communication interface 12 uses any device such as a transceiver to communicate with other devices or communication networks, such as an Ethernet, an RAN, a Wireless Local Area Networks (WLAN), and the like. The communication interface 12 may include a reception unit used to implement a reception function, and a transmission unit used to implement a transmission function.

The communication bus 13 may be a Peripheral Component Interconnect (PCI) bus or an Extended Industry Standard Architecture (EISA) bus, etc. The communication bus 13 may be divided into an address bus, a data bus, a control bus, and the like. For ease of representation, only a thick line is used in FIG. 3 to represent the communication bus 13, but the present disclosure does not mean that there is only one bus or one type of bus.

The UE 01 shown in FIG. 3 may perform operations performed by a UE in the frequency-band state processing method provided by some embodiments of the present disclosure. For example, in one implementation, the communication interface 12 in the UE 01 may be used to receive control signaling sent by a network device: the processor 10 in the UE 01 may be used to configure, according to a state configuration indication included in the control signaling, a BWP state of a BWP corresponding to a BWP identifier included in the control signaling.

It should be noted that, a structure of the device shown in FIG. 3 does not constitute a limitation to the UE, the structure of the device may include more or fewer components than those shown in the FIG. 3, or may combine some components, or may arrange different components. Some embodiments of the present disclosure are not limited to these. Although not shown, the UE may further include modules such as a display, a battery, a camera, a Bluetooth module, a global positioning system (GPS), and the like, details of which are not described herein again.

Figure 4:
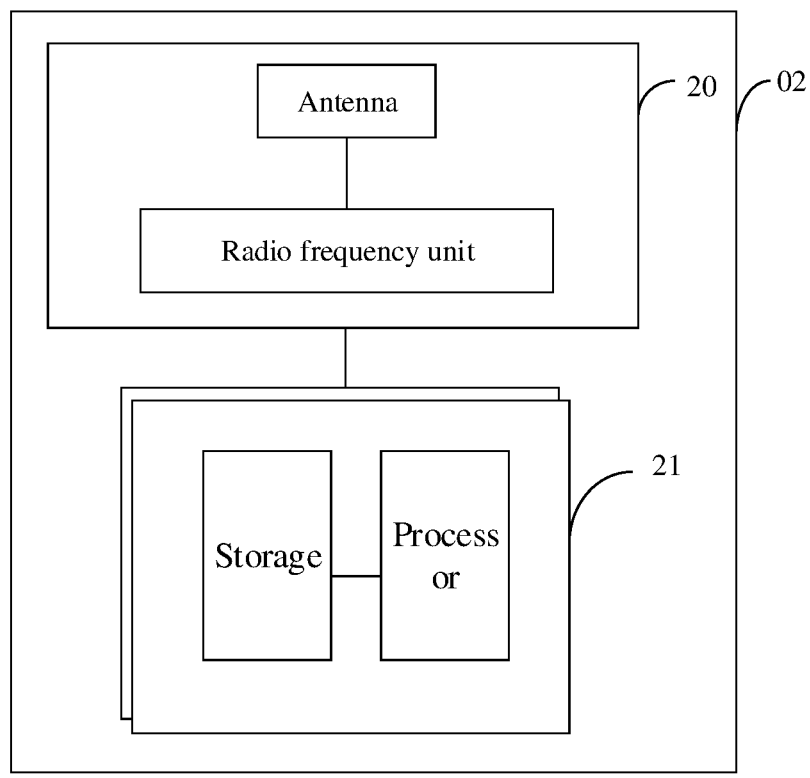
FIG. 4 is a schematic diagram illustrating a structure of a base station provided by some embodiments of the present disclosure.

Some embodiments of the present disclosure also provide a network device, such as a base station. FIG. 4 is a schematic diagram illustrating a structure of a base station. As shown in FIG. 4, the base station 02 includes a portion 20 and a portion 21.

The following describes each portion of the base station 02 in detail with reference to FIG. 4.

The portion 20 is mainly used for transmitting and receiving radio frequency (RF) signals and conversion between RF signals and baseband signals. The portion 21 is mainly used for baseband processing and used for controlling the base station 02, etc. The portion 20 may usually be called a transceiver unit, a transceiver, or a transceiver circuit, etc. The portion 21 is usually a control center of the base station 02, which may be generally called a processing unit, and is used to control the base station 02 to perform the steps performed by the base station 02 (i.e., a serving base station) in FIG. 4.

The transceiver unit of the portion 20 may also be called a transceiver, etc., which includes an antenna and a radio frequency (RF) unit, wherein the radio frequency unit is mainly used for radio frequency processing. Optionally, a device for implementing a reception function in the portion 20 may be regarded as a reception unit and a device for implementing a transmission function may be regarded as a transmission unit, that is, the portion 20 includes the reception unit and the transmission unit. The reception unit may also be called a receiver, a receiving device or a reception circuit, etc., and the transmission unit may be called a transmitter, a transmitting device or a transmission circuit, etc.

The portion 21 may include one or more single boards, and each single board may include one or more processors and one or more storages. The one or more processors are used to read and execute a program in the storage to implement a baseband processing function and to control the base station 02. If there are a plurality of single boards, the plurality of single boards may be interconnected to increase a processing capacity. As an optional implementation, a plurality of single boards may share one or more processors, or a plurality of single boards may share one or more storages, or a plurality of single boards may share one or more processors simultaneously. The storage and the processor may be integrated or independently configured. In some embodiments, the portion 20 and the portion 21 may be integrated together or may be configured independently. In addition, all functions in the portion 21 may be integrated into one chip in actual implementation, or a part of functions may be integrated into one chip in actual implementation, and the remaining of the functions may be integrated into one or more other chips in actual implementation. Some embodiments of the present disclosure are not limited to these.

The base station 02 shown in FIG. 4 may perform operations performed by a network device in the frequency-band state processing method provided by some embodiments of the present disclosure. For example, in one implementation, the portion 21 in the base station 02 may be used to generate control signaling; the portion 20 in the base station 02 may be used to send the control signaling to a UE.

It should be noted that, the structure of the device shown in FIG. 4 does not constitute a limitation to the base station, and may include more or fewer components than those shown in the figure, or may combine some components, or may arrange different components. Some embodiments of the present disclosure are not limited to these.

Figure 5:
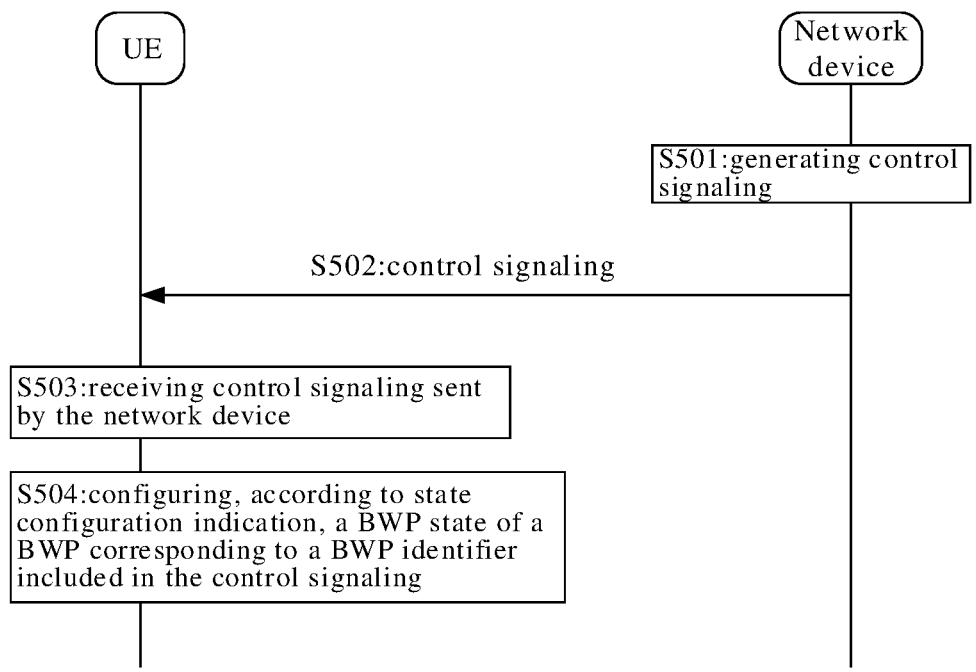
FIG. 5 is a first schematic flowchart illustrating a frequency-band state processing method provided by some embodiments of the present disclosure.

Based on interaction between the UE 01 and the base station 02 in the system shown in FIG. 2, each module or component of the UE 01 shown in FIG. 3, and each module or component of the base station 02 shown in FIG. 4, some embodiments of the present disclosure provide a frequency-band state processing method. This method describes in detail an interaction process between the UE 01 and the network device in the system shown in FIG. 2. FIG. 5 is a schematic flowchart illustrating a frequency-band state processing method provided by some embodiments of the present disclosure; specifically, as shown in FIG. 5, the frequency-band state processing method may include steps S501 to S504.

Step 501: generating, by a network device, control signaling.

The control signaling includes at least one BWP identifier and a state configuration indication, the state configuration indication includes an activation indication or a deactivation indication, and the state configuration indication is used to indicate that a UE configures a BWP state of a BWP corresponding to the BWP identifier included in the control signaling. A BWP identifier is used to uniquely identify a BWP.

The activation indication in the control signaling is used to indicate that the UE activates the BWP corresponding to the BWP identifier included in the control signaling: the deactivation indication in the control signaling is used to indicate that the UE deactivates the BWP corresponding to the BWP identifier included in the control signaling.

Illustratively, the network device configures at least one BWP for the UE and sends BWP configuration information to the UE; after the network device configures the at least one BWP for the UE, the network device generates control signaling including at least one BWP identifier and a state configuration indication.

For example, it is assumed that the network device configures 5 different BWPs for the UE, which are BWP 1, BWP 2, BWP 3, BWP 4, and BWP 5, respectively. The control signaling includes a BWP identifier of the BWP 1 (such as 1), a BWP identifier of the BWP 2 (such as 2), a BWP identifier of the BWP 3 (such as 3), a BWP identifier of the BWP 4 (such as 4), and a BWP identifier of the BWP 5 (Such as 5). It is assumed that the activation indication may be used to indicate that the UE activates the BWP 2 corresponding to the BWP identifier 2, the BWP 4 corresponding to the BWP identifier 4, and the BWP 5 corresponding to the BWP identifier 5; the deactivation indication may be used to indicate that the UE deactivates the BWP 1 corresponding to the BWP identifier 1 and the BWP 3 corresponding to BWP identifier 3.

It should be noted that, whether the state configuration indication included in the control signaling generated by the network device is the activation indication or the deactivation indication may be determined according to requirements of the UE (such as a link state, a channel quality, etc.).

S502: sending, by the network device, the control signaling to the UE.

After the network device generates the control signaling, the network device may send a Radio Resource Control (RRC) message to the UE, and the RRC message carries the control signaling. For example, the base station 02 sends the RRC message to the UE through the portion 20.

Step 503: receiving, by the UE, the control signaling sent by the network device.

The UE receives, through the communication interface 12, the control signaling sent by the network device.

Figure 6:
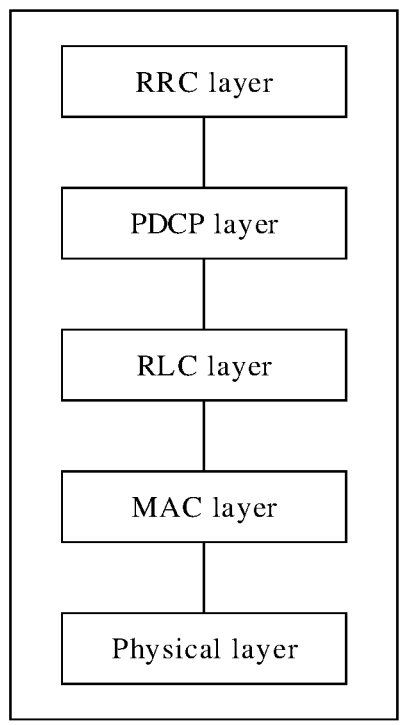
FIG. 6 is a schematic diagram illustrating a network architecture of a UE provided by some embodiments of the present disclosure.

Illustratively, as shown in FIG. 6, FIG. 6 shows a schematic diagram of a network architecture of a UE provided by some embodiments of the present disclosure. The network architecture may include: a physical layer, a Media Access Control (MAC) layer, a Radio Link Control (RLC) layer, a Packet Data Convergence Protocol (PDCP) layer, and an RRC layer.

The physical layer is at a lowest level in the network architecture, which may provide transmission media and interconnected devices for data communication between devices, and provide a reliable environment for data transmission. The MAC layer is mainly responsible for controlling and connecting a physical medium of the physical layer. The RLC layer provides segmentation and retransmission services for user data and control data. The PDCP layer may process RRC messages on a control plane and Internet Protocol (IP) packets on a user plane. The RRC layer is responsible for broadcasting system information and transmitting dedicated control information.

Illustratively, after the physical layer of the UE receives the control signaling, the physical layer of the UE delivers at least one BWP identifier and a state configuration indication in the control signaling to the MAC layer or the RRC layer of the UE, so that the MAC layer or the RRC layer performs a corresponding processing on the at least one BWP according to the state configuration indication.

S504: configuring, by the UE according to the state configuration indication, a BWP state of a BWP corresponding to the BWP identifier included in the control signaling.

The processor 10 of the UE may configure the BWP state of the BWP corresponding to the BWP identifier included in the control signaling according to the activation indication; or the processor 10 of the UE may configure the BWP state of the BWP corresponding to the BWP identifier included in the control signaling according to the deactivation indication.

Illustratively, it is assumed that the control signaling includes a BWP identifier 2 and a BWP identifier 4 and an activation indication. The processor 10 of the UE may configure the BWP state of the BWP 2 corresponding to the BWP identifier 2 according to the activation indication, that is, the BWP state of the BWP 2 is configured as an activated state, and the processor 10 of the UE may configure the BWP state of the BWP 4 corresponding to the BWP identifier 4 according to the activation indication, that is, the BWP state of the BWP 4 is configured as the activated state.

Some embodiments of the present disclosure provide a frequency-band state processing method. The UE may configure the BWP state of the BWP corresponding to the BWP identifier according to at least one BWP identifier and the state configuration indication included in the received control signaling, and may flexibly manage the BWP state of the BWP, thereby increasing a gain of frequency diversity and further improving a frequency-band utilization rate.

Further, because the state configuration indication may be sent by the network device according to the requirements of the UE (such as the link state, the channel quality, etc.), the UE may be indicated to activate or deactivate an appropriate BWP according to the requirements of the UE (such as the link state, the channel quality, etc.), which may ensure a data transmission quality of the UE, thereby reducing a packet loss rate and a power loss of the UE.

Figure 7:
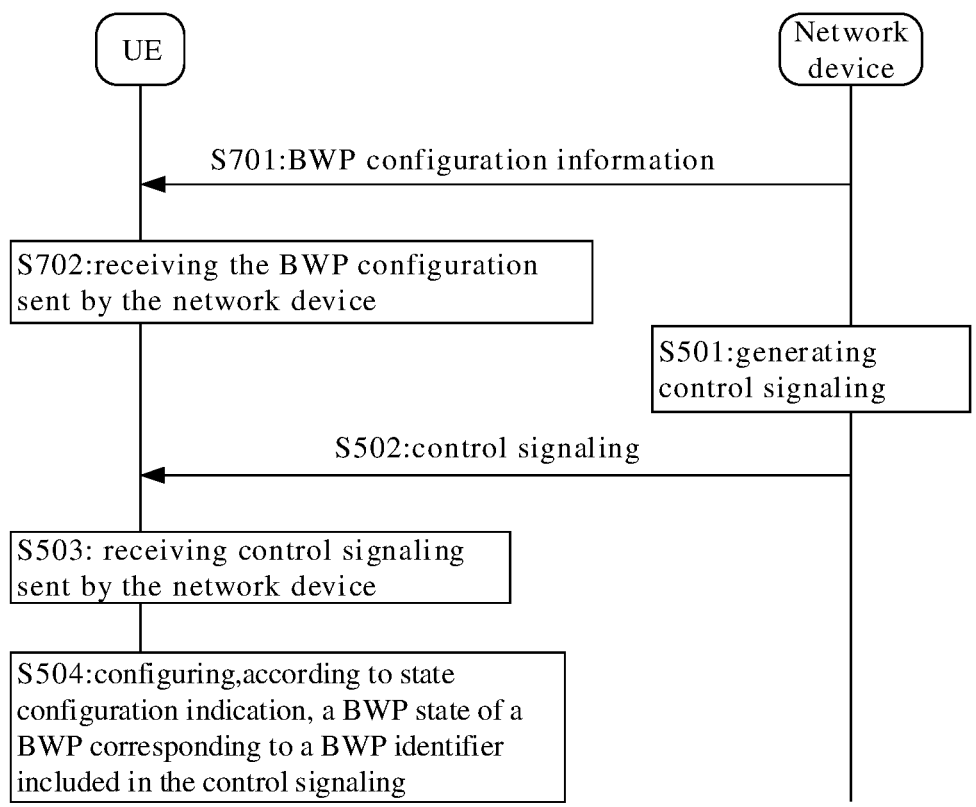
FIG. 7 is a second schematic flowchart illustrating a frequency-band state processing method provided by some embodiments of the present disclosure.

Optionally, in some embodiments of the present disclosure, in combination with FIG. 5 and FIG. 7, prior to the above S501, the frequency-band state processing method provided by some embodiments of the present disclosure may further include steps S701 and S702. S701 and S702 are described now.

S701: sending, by the network device. BWP configuration information to the UE.

The BWP configuration information includes at least one BWP identifier, at least one BWP type corresponding to the at least one BWP identifier, and/or at least one BWP initial state corresponding to the at least one BWP identifier, wherein the BWP initial state includes an activated state and a deactivated state, and the BWP type may include a primary BWP and a secondary BWP. A BWP identifier is used to uniquely identify a BWP.

Illustratively, after the network device configures at least one BWP for the UE, the network device may send the BWP configuration information to the UE through the portion 20, wherein the BWP configuration information includes the BWP identifier of the at least one BWP, the BWP type of the at least one BWP, and/or the BWP initial state of the at least one BWP.

For example, the network device configures 5 different BWPs for the UE, which are BWP 1, BWP 2, BWP 3, BWP 4, and BWP 5, respectively. The BWP configuration information sent by the network device to the UE includes the BWP identifier, the BWP type, and/or the BWP initial state of the BWP 1: the BWP identifier, the BWP type, and/or the BWP initial state of the BWP 2; the BWP identifier, the BWP type, and/or the BWP initial state of the BWP 3; the BWP identifier, the BWP type, and/or the BWP initial state of the BWP 4; and the BWP identifier, the BWP type, and/or the BWP initial state of the BWP 5.

Illustratively, Table 1 is an example of a correspondence table among BWP identifiers, BWP types, and BWP initial states of 5 different BWPs provided by some embodiments of the present disclosure.

TABLE 1

A correspondence table among BWP identifiers, BWP types, and BWP initial states of different BWPs

| | BWP identifier | BWP type | BWP initial state |
|---|---|---|---|
| BWP 1 | 1 | Primary | Activated state |
| BWP 2 | 2 | Secondary | Deactivated state |
| BWP 3 | 3 | Secondary | Activated state |
| BWP 4 | 4 | Primary | Deactivated state |
| BWP 5 | 5 | Secondary | Deactivated state |

The BWP identifier of the BWP 1 is 1, the BWP type of the BWP 1 is a primary BWP, the BWP initial state of the BWP 1 is an activated state; the BWP identifier of the BWP 2 is 2, the BWP type of the BWP 2 is a secondary BWP, the BWP initial state of the BWP 2 is a deactivated state; the BWP identifier of the BWP 3 is 3, the BWP type of the BWP 3 is a secondary BWP, the BWP initial state of the BWP 3 is an activated state; the BWP identifier of the BWP 4 is 4, the BWP type of the BWP 4 is a primary BWP, the BWP initial state of the BWP 4 is a deactivated state; the BWP identifier of the BWP 5 is 5, the BWP type of BWP 5 is a secondary BWP, the BWP initial state of the BWP 5 is a deactivated state.

S702: receiving, by the UE, BWP configuration information sent by the network device.

Illustratively, the UE receives, through the communication interface 12, the BWP configuration information sent by the network device.

Figure 8:
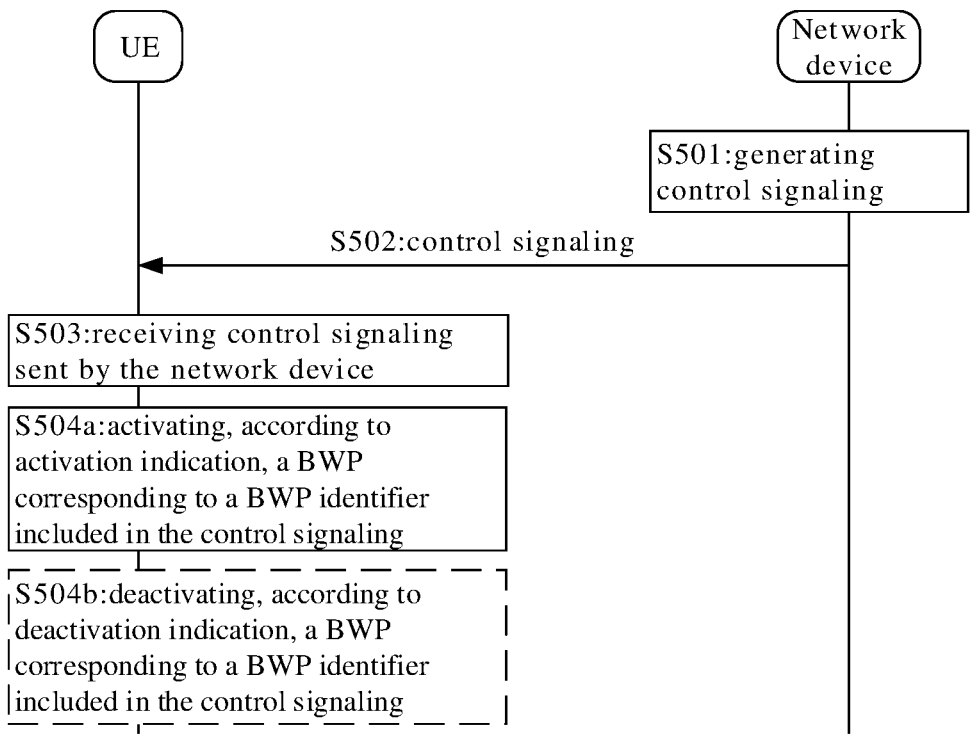
FIG. 8 is a third schematic flowchart illustrating a frequency-band state processing method provided by some embodiments of the present disclosure.

Optionally, in some embodiments of the present disclosure, in combination with FIG. 5 and FIG. 8, the above S504 may be specifically implemented by S504*a* or S504*b*, and S504*a* and S504*b* are described now.

S504*a*: activating, by the UE according to the activation indication, the BWP corresponding to the BWP identifier included in the control signaling.

Illustratively, after the physical layer of the UE receives the control signaling, the physical layer of the UE delivers at least one BWP identifier and an activation indication in the control signaling to the MAC layer or the RRC layer of the UE, so that the MAC layer or the RRC layer activates the BWP corresponding to the BWP identifier included in the control signaling according to the activation indication.

For example, it is assumed that the control signaling received by the physical layer of the UE includes a BWP identifier 2 and a BWP identifier 4 and an activation indication. The physical layer delivers the BWP identifier 2, the BWP identifier 4 and the activation indication to the MAC layer or the RRC layer. The MAC layer or the RRC layer activates the BWP 2 corresponding to the BWP identifier 2 according to the activation indication, and the BWP state of the BWP 2 is an activated state, and the MAC layer or the RRC layer activates the BWP 4 corresponding to the BWP identifier 4 according to the activation indication, and the BWP state of the BWP 4 is an activated state.

Illustratively, S504*a* of some embodiments of the present disclosure may specifically include at least one of the following S504*a*1-S504*a*5:

S504*a*1: activating, by the UE according to the activation indication, transmission of an SRS on the BWP corresponding to the BWP identifier included in the control signaling.

S504*a*2: activating, by the UE according to the activation indication, transmission of a channel quality reporting of the BWP corresponding to the BWP identifier included in the control signaling.

S504*a*3: activating, by the UE according to the activation indication, monitoring of a PDCCH.

The PDCCH is used to control the BWP corresponding to the BWP identifier included in the control signaling.

S504*a*4: activating, by the UE according to the activation indication, monitoring of the PDCCH on the BWP corresponding to the BWP identifier included in the control signaling.

S504*a*5: activating, by the UE according to the activation indication, transmission of a PUCCH on the BWP corresponding to the BWP identifier included in the control signaling.

It should be noted that, specific implementations of S504a1 to S504a5 may be obtained by referring to specific description of S504a and related methods in the related art, and are not repeated here in some embodiments of the present disclosure.

S504b: deactivating, by the UE according to the deactivation indication, the BWP corresponding to the BWP identifier included in the control signaling.

Illustratively, after the physical layer of the UE receives the control signaling, the physical layer of the UE delivers at least one BWP identifier and a deactivation indication in the control signaling to the MAC layer or the RRC layer of the UE, so that the MAC layer or the RRC layer deactivates the BWP corresponding to the BWP identifier included in the control signaling according to the deactivation indication.

For example, it is assumed that the control signaling received by the physical layer of the UE includes a BWP identifier 1 and a BWP identifier 3 and a deactivation indication. The physical layer delivers the BWP identifier 1, the BWP identifier 3 and the deactivation indication to the MAC layer or the RRC layer. The MAC layer or the RRC layer deactivates the BWP 1 corresponding to the BWP identifier 1 according to the deactivation indication, and the BWP state of the BWP 1 is a deactivated state, and the MAC layer or the RRC layer deactivates the BWP 3 corresponding to the BWP identifier 3 according to the deactivation indication, and the BWP state of the BWP 3 is a deactivated state.

Illustratively, S504b in some embodiments of the present disclosure may specifically include at least one of the following S504b1-S504b8.

S504b1: deactivating, by the UE according to the deactivation indication, transmission of an SRS on the BWP corresponding to the BWP identifier included in the control signaling.

S504b2: deactivating, by the UE according to the deactivation indication, transmission of a channel quality reporting of the BWP corresponding to the BWP identifier included in the control signaling.

S504b3: deactivating, by the UE according to the deactivation indication, transmission of an uplink data channel on the BWP corresponding to the BWP identifier included in the control signaling.

S504b4: deactivating, by the UE according to the deactivation indication, transmission of an uplink control channel on the BWP corresponding to the BWP identifier included in the control signaling.

S504b5: deactivating, by the UE according to the deactivation indication, monitoring of a PDCCH, wherein the PDCCH is used to control the BWP corresponding to the BWP identifier included in the control signaling.

S504b6: deactivating, by the UE according to the deactivation indication, monitoring of a PDCCH on the BWP corresponding to the BWP identifier included in the control signaling.

S504b7: deactivating, by the UE according to the deactivation indication, transmission of an uplink random access channel on the BWP corresponding to the BWP identifier included in the control signaling.

S504b8: terminating, by the UE according to the deactivation indication, a random access procedure initiated on the BWP corresponding to the BWP identifier included in the control signaling.

It should be noted that, specific implementations of S504b1 to S504b8 may be obtained by referring to specific description of S504b and related methods in the related art, and are not repeated here in some embodiments of the present disclosure.

In some embodiments of the present disclosure, because the state configuration indication may be sent by the network device according to requirements of the UE (such as a link state, a channel quality, etc.), the UE may be indicated to activate or deactivate an appropriate BWP according to requirements of the UE (such as a link state, a channel quality, etc.), so that UE sends data accurately in real time in a case that the UE sends data on the activated BWP, which may ensure a data transmission quality of the UE, thereby reducing a packet loss rate and a power loss of the UE.

Figure 9:
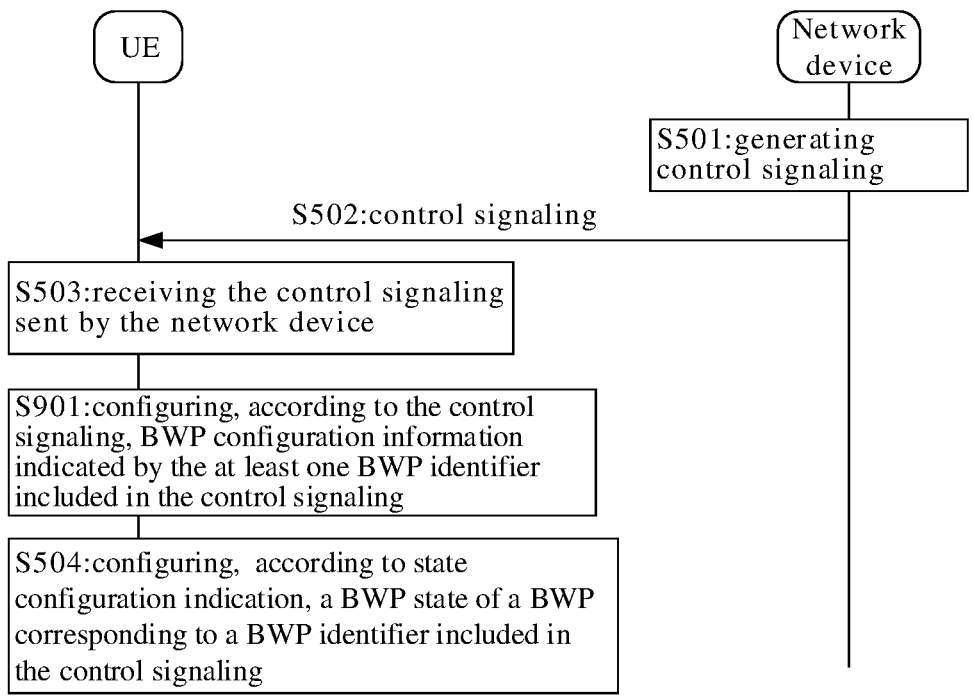
FIG. 9 is a fourth schematic flowchart illustrating a frequency-band state processing method provided by some embodiments of the present disclosure.

Certainly, in some embodiments of the present disclosure, after the UE receives the control signaling sent by the network device, the UE may further configure the BWP configuration information indicated by at least one BWP identifier included in the control signaling. Specifically, FIG. 9 shows a frequency-band state processing method provided by some embodiments of the present disclosure. Compared with the frequency-band state processing method shown in FIG. 5, S901 is added after S503, and only difference therebetween is described in detail here. Referring to FIG. 9, the frequency-band state processing method includes S501-S503, S901, and S504.

S501: generating, by a network device, control signaling.

S502: sending, by the network device, the control signaling to a UE.

S503: receiving, by the UE, the control signaling sent by the network device.

S901: configuring, by the UE according to the control signaling, BWP configuration information indicated by the at least one BWP identifier included in the control signaling.

The BWP configuration information includes first state indication information and/or first type indication information. The first state indication information is used to indicate a BWP state, and the BWP state includes an activated state and a deactivated state; the first type indication information is used to indicate a BWP type, and the BWP type includes a primary BWP and a secondary BWP.

Illustratively, the processor 10 of the UE may configure the BWP state and/or the BWP type of the BWP indicated by at least one BWP identifier included in the control signaling according to the activation indication; or the processor 10 of the UE may configure the BWP state and/or the BWP type of the BWP indicated by at least one BWP identifier included in the control signaling according to the deactivation indication.

For example, it is assumed that the control signaling includes a BWP identifier 2, a BWP identifier 4 and an activation indication. The BWP configuration information indicated by the BWP identifier 2 includes the first state indication information and the first type indication information, and the BWP state corresponding to the BWP identifier 2 and indicated by the first state indication information is a deactivated state; the BWP type corresponding to the BWP identifier 2 and indicated by the first type indication information is a secondary BWP. The BWP configuration information indicated by the BWP identifier 4 includes the first state indication information and the first type indication information, and the BWP state corresponding to the BWP identifier 4 and indicated by the first state indication information is a deactivated state, the BWP type corresponding to the BWP identifier 4 and indicated by the first type indication information is a primary BWP. According to the activation indication, the UE may configure the BWP state and BWP type of the BWP 2 indicated by the BWP identifier 2 and configure the BWP state and BWP type of the BWP 4 indicated by the BWP identifier 4 according to the activation indication.

Illustratively, in some embodiments of the present disclosure, after the UE receives the control signaling sent by the network device, the UE may configure the BWP configuration information according to a protocol between the UE and the network device: the UE may also configure the BWP configuration information according to the indication information (such as second state indication information) sent by the network device.

Further, the control signaling in some embodiments of the present disclosure may further include second state indication information, or include second type indication information, or include both the second state indication information and the second type indication information. The second state indication information is used to indicate a BWP state configured based on the state configuration indication, and the second type indication information is used to indicate a BWP type configured based on the state configuration indication.

For example, referring to the BWP initial states and the BWP types of 5 different BWPs shown in Table 1. The second state indication information is used to indicate that the BWP state of the BWP 1 configured based on the deactivation indication is a deactivated state, the BWP state of the BWP 3 configured based on the deactivation indication is a deactivated state; or, the second state indication information is used to indicate that the BWP states of the BWP 2, the BWP 4, and the BWP 5 configured based on the activation indication are the activated state. The second type indication information is used to indicate that the BWP type of the BWP 1 configured based on the deactivation indication is a secondary BWP, the BWP type of the BWP 3 configured based on the deactivation indication is a primary BWP: or, the second type indication information is used to indicate that the BWP type of the BWP 2 configured based on the activation indication is a primary BWP, the BWP type of the BWP 4 configured based on the activation indication is a secondary BWP, and the BWP type of the BWP 5 configured based on the activation indication is a primary BWP.

In some embodiments of the present disclosure, after the UE configures the BWP configuration information according to the control signaling, the BWP state and/or the BWP type of the BWP may be configured by the UE, so that the UE may manage accurately and in real-time the BWP state and/or the BWP type configured by the UE.

Figure 10:
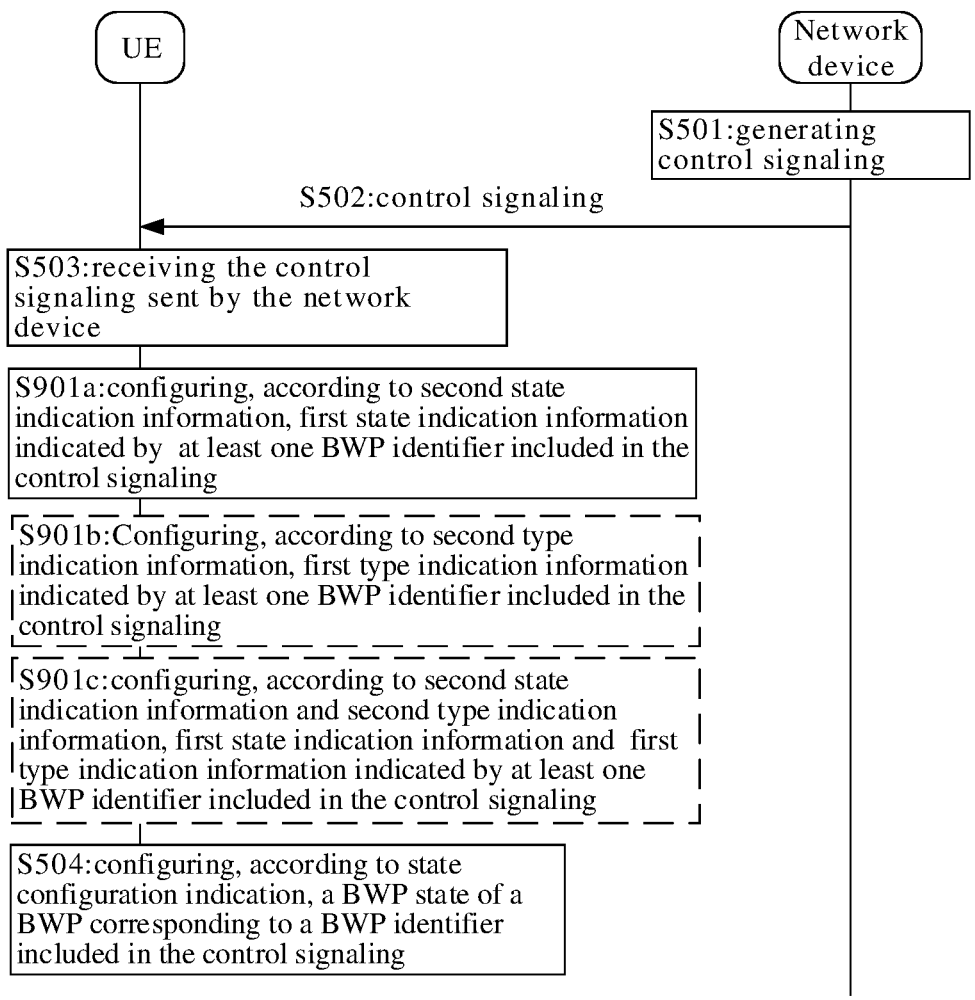
FIG. 10 is a fifth schematic flowchart illustrating a frequency-band state processing method provided by some embodiments of the present disclosure.

Illustratively, in some embodiments of the present disclosure, the UE may configure the BWP configuration information indicated by the at least one BWP identifier included in the control signaling, according to the second state indication information, or according to the second type indication information, or according to the second state indication information and the second type indication information. Specifically, in combination with FIG. 9 and FIG. 10, the above S901 may be specifically implemented by S901a, S901b, or S901c:

S901a: configuring, by the UE according to the second state indication information, first state indication information indicated by the at least one BWP identifier included in the control signaling.

The processor 10 of the UE may configure, according to the second state indication information, the BWP state of the BWP indicated by the at least one BWP identifier included in the control signaling.

Illustratively, the second state indication information is used to indicate that the BWP state of the BWP 1 configured based on the deactivation indication is a deactivated state, and the process 10 may configure the BWP state of the BWP 1 as the deactivated state according to the second state indication information.

S901b: configuring, by the UE according to the second type indication information, first type indication information indicated by the at least one BWP identifier included in the control signaling.

The processor 10 of the UE may configure, according to the second type indication information, the BWP type of the BWP indicated by the at least one BWP identifier included in the control signaling.

Illustratively, the second type indication information is used to indicate that the BWP type of the BWP 1 configured based on the deactivation indication is a secondary BWP, the processor 10 may configure the BWP type of the BWP 1 as the secondary BWP according to the second type indication information.

S901c: configuring, by the UE according to the second state indication information and the second type indication information, the first state indication information and the first type indication information indicated by the at least one BWP identifier included in the control signaling.

The processor 10 of the UE may configure, according to the second state indication information and the second type indication information, the BWP state and the BWP type of the BWP indicated by the at least one BWP identifier included in the control signaling.

Illustratively, the processor 10 may configure the BWP state of the BWP 1 as a deactivated state according to the second state indication information, and configure the BWP type of the BWP 1 as the secondary BWP according to the second type indication information.

S504: configuring, by the UE according to the state configuration indication, a BWP state of a BWP corresponding to the BWP identifier included in the control signaling.

It should be noted that, in some embodiments of the present disclosure, S901 may be performed first, and then S504 may be performed. Optionally, S504 may be performed first, and then S901 may be performed. Optionally, S901 and S504 may also be performed simultaneously. Some embodiments of the present disclosure do not limit an order of performing the S901 and the S504.

The above mainly introduces technical solutions provided by some embodiments of the present disclosure from perspectives of the UE and the network device. It can be understood that, in order to implement the above functions, the UE and the network device include hardware structures and/or software modules for performing respective functions. A person skilled in the art may easily be aware that, exemplary UEs, network devices and algorithm steps described in connection with the embodiments disclosed herein may be implemented by hardware or a combination of computer software and hardware in the present disclosure. Whether some functions are performed by hardware or through hardware driven by software depends on particular applications and design constraint conditions of the technical solutions. A person skilled in the art may use different methods to implement the described functions in each particular application, but it should not be considered that the implementation goes beyond the scope of the present disclosure.

In some embodiments of the present disclosure, functional modules or functional units of a UE and a network device may be divided according to the foregoing method examples. For example, each function may be divided as a corresponding functional module or a functional unit, or two or more functions may be integrated into one processing module. The integrated modules may be implemented through hardware, or may also be implemented in a form of a software functional module or a software functional unit. In some embodiments of the present disclosure, a division to a module or a unit is illustrative and is only a logical function division, and there may be another division in actual implementation.

Figure 11:
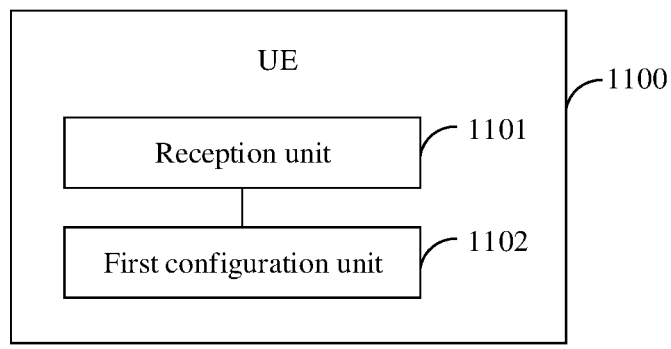
FIG. 11 is a second schematic diagram illustrating a structure of a UE provided by some embodiments of the present disclosure.

In a case where each function is divided as a corresponding functional module, FIG. 11 shows a schematic diagram of a structure of a UE involved in the foregoing embodiment. As shown in FIG. 11, the UE 1100 may include a reception unit 1101 and a first configuration unit 1102.

The reception unit 1101 is used to support S503 and S702 in the above embodiments, and/or other processes used in techniques described herein. The first configuration unit 1102 is used to support S504, S504a, S504a1-S504a5, S504b and S504b1-S504b8 in the above embodiments, and/or other processes used in the techniques described herein.

Figure 12:
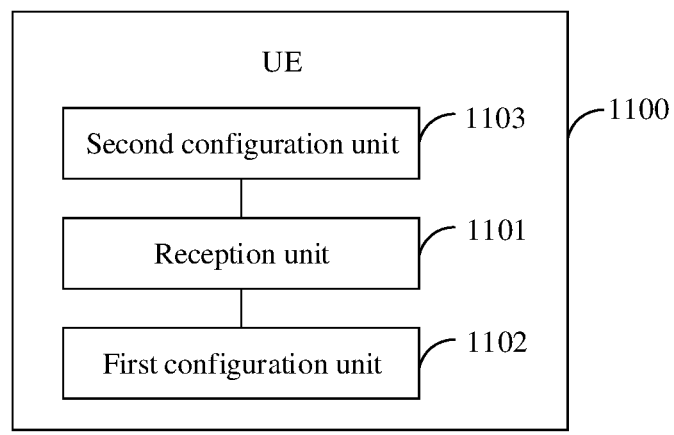
FIG. 12 is a third schematic diagram illustrating a structure of a UE provided by some embodiments of the present disclosure.

Further, as shown in FIG. 12, the UE 1100 shown in FIG. 11l may also include: a second configuration unit 1103.

The second configuration unit 1103 is used to support S901, S901a, S901b and S901c in the above embodiments, and/or other processes used in the techniques described herein.

Certainly, the UE 1100 provided by some embodiments of the present disclosure includes, but is not limited to, the above-mentioned units. For example, the UE 1100 may further include a transmission unit and a storage unit. For example, the transmission unit is used to send data to a network device. The storage unit is used to store control signaling.

In a case of using an integrated unit, the above-mentioned first configuration unit 1102, the second configuration unit 1103, and the like may be integrated into a single processing module in actual implementation, and the processing module may be a processor 10 in the UE 01 shown in FIG. 3. The transmission unit and the reception unit 1101 may be integrated into a single communication module in actual implementation, and the communication module may be a communication interface 12 in the UE 01 shown in FIG. 3. The storage unit may be a storage 11 in the UE 01 shown in FIG. 3.

A computer readable storage medium is further provided by some embodiments of the present disclosure, a computer program is stored on the computer readable storage medium. In a case that the processor 10 of the UE 01 executes the computer program, the UE 01 performs steps of the relevant method according to any one of FIG. 5 and FIG. 7 to FIG. 10. The computer readable storage medium mentioned in the present disclosure may be a static or non-transitory computer readable medium, or may be a non-static or transitory computer readable storage medium.

A detailed description of each module in the UE 01 provided by some embodiments of the present disclosure and technical effects brought by each module or each unit after performing steps of the relevant method in any one of FIG. 5 and FIG. 7 to FIG. 10, may be obtained by referring to relevant description in the method embodiments of the present disclosure, which are not repeated here.

A computer program product is further provided by some embodiments of the present disclosure. In a case that the computer program product is executed on a computer, the computer is caused to execute steps of the relevant method according to any one of FIG. 5 and FIG. 7 to FIG. 10.

The UE 01, the UE 1100, the computer readable storage medium, or the computer program product provided by some embodiments of the present disclosure are used to execute the corresponding methods provided above. Therefore, achieved beneficial effects may be obtained by referring to the beneficial effects in the corresponding methods provided above, which are not repeated here.

Figure 13:
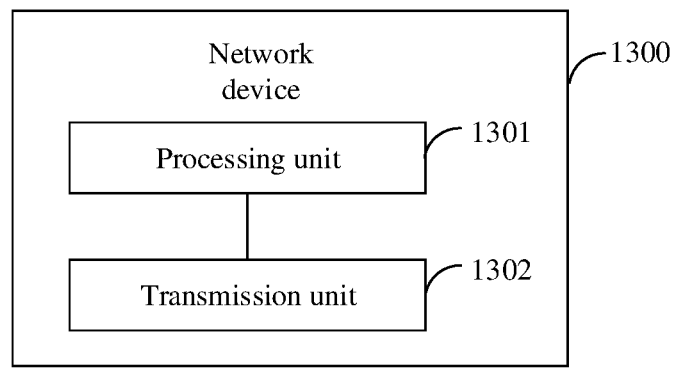
FIG. 13 is a schematic diagram illustrating a structure of a network device provided by some embodiments of the present disclosure.

In a case where each function is divided as a corresponding functional module, FIG. 13 shows a schematic diagram illustrating a structure of a network device involved in the foregoing embodiment. As shown in FIG. 13, the network device 1300 may include: a processing unit 1301 and a transmission unit 1302.

The processing unit 1301 is used to support S501 in the above embodiments, and/or other processes used in the techniques described herein. The transmission unit 1302 is used to support S502 and S701 in the above embodiments, and/or other processes used in the techniques described herein.

Certainly, the network device 1300 provided by some embodiments of the present disclosure includes, but is not limited to, the above-mentioned units. For example, the network device 1300 may further include a reception unit. For example, the reception unit is used to receive data sent by a UE.

In a case of using an integrated unit, the above-mentioned processing unit 1301 may be integrated into a single processing module in actual implementation. For example, the processing module may be the portion 21 in the base station 02 shown in FIG. 4. The transmission unit 1302 and the reception unit may be integrated into a single communication module in actual implementation, for example, the communication module may be the portion 20 in the base station 02 shown in FIG. 4.

A computer readable storage medium is further provided by some embodiments of the present disclosure, a computer program is stored on the computer readable storage medium. For example, in a case that the portion 21 of the base station 02 executes the computer program, the base station 02 performs steps of the relevant method according to any one of FIG. 5 and FIG. 7 to FIG. 10. The computer readable storage medium mentioned in the present disclosure may be a static or non-transitory computer readable medium, or may be a non-static or transitory computer readable storage medium.

A computer program product is further provided by some embodiments of the present disclosure. In a case that the computer program product is executed on a computer, the computer is caused to execute steps of the relevant method according to any one of FIG. 5 and FIG. 7 to FIG. 10.

The base station 02, the network device 1300, the computer readable storage medium, or the computer program product provided by some embodiments of the present disclosure are used to execute the corresponding methods provided above. Therefore, the beneficial effects that may be achieved may be obtained by referring to beneficial effects in the corresponding methods provided above, which are not repeated here.

Through description of the above embodiments, a person skilled in the art may clearly understand that, for convenience and brevity of the description, only a division of the above functional modules is illustrated by way of example. In practical applications, the above functions may be assigned to different functional modules as required. That is, an internal structure of a device is divided into different functional modules to complete all or a part of the functions described above.

In some embodiments of the present disclosure, it should be understood that the disclosed device and method may be implemented in other manners. For example, the described device embodiment is merely exemplary. For example, a module division or a unit division is merely a logical function division and there may exist another division in actual implementation.

For example, a plurality of units or components may be combined or integrated into another device, or some features may be ignored or not performed. In addition, a mutual coupling or a direct coupling or a communication connection shown or discussed may be an indirect coupling or a communication connection through some interfaces, devices or units, and may be in an electrical, mechanical or other form.

Units described as separate parts may or may not be physically separate, and parts displayed as units may be one or more physical units, that is, may be located at one place, or may be distributed on a plurality of different places. A part or all of the units may be selected according to actual needs to achieve objectives of solutions of the embodiments.

In addition, various functional units in various embodiments of the present disclosure may be integrated into one processing unit, or each of the units may exist alone physically, or two or more units may be integrated into one unit. The integrated unit may be implemented through hardware, or may also be implemented in a form of software functional modules.

If the integrated unit is implemented in form of software functional units and sold or used as an independent product, the integrated unit may be stored in a readable storage medium. Based on such an understanding, an essential part or a part contributing to the prior art of the technical solutions of some embodiments of the present disclosure, or a part or all of the technical solutions may be implemented in form of a software product. The software product is stored in a storage medium, and includes several instructions for instructing a device (which may be a Single Chip Microcomputer, or a chip, etc.) or a processor to perform all or a part of the steps of the methods described in various embodiments of the present disclosure. The foregoing storage medium includes various media that can store program codes, such as a USB flash drive, a removable hard disk, a ROM, a RAM, a magnetic disk, or an optical disk.

The aforementioned are merely specific implementations of the present disclosure, but the protection scope of the present disclosure is by no means limited thereto. Any modifications or substitutions, without departing from the technical scope disclosed in the present disclosure, should be encompassed in the protection scope of the present disclosure. Therefore, the protection scope of the present disclosure is to be determined by the protection scope of the claims.

What is claimed is:

1. A frequency-band state processing method, comprising:
receiving, by user equipment (UE), first bandwidth part (BWP) configuration information sent by the network device, wherein the first BWP configuration information comprises at least one BWP identifier, and at least one BWP initial state corresponding to the at least one BWP identifier, wherein the BWP initial state comprises an activated state and a deactivated state;
receiving, by a physical layer of the UE, control signaling sent by a network device; wherein the control signaling comprises the at least one BWP identifier and a state configuration indication, and the state configuration indication comprises an activation indication or a deactivation indication;
configuring, by a Media Access Control (MAC) layer or an RRC layer of the UE, a BWP state of a BWP corresponding to the BWP identifier comprised in the control signaling according to the state configuration indication and the first BWP configuration information.

2. The method according to claim 1, wherein configuring, by the MAC layer or the RRC layer of the UE, the BWP state of the BWP corresponding to the BWP identifier comprised in the control signaling according to the state configuration indication and the first BWP configuration information comprises:
activating, by the MAC layer or the RRC layer of the UE, the BWP corresponding to the BWP identifier comprised in the control signaling according to the activation indication; or
deactivating, by the MAC layer or the RRC layer of the UE, the BWP corresponding to the BWP identifier comprised in the control signaling according to the deactivation indication.

3. The method according to claim 1, wherein after receiving, by the UE, the control signaling sent by the network device, the method further comprises:
configuring, by the UE according to the control signaling, second BWP configuration information indicated by the at least one BWP identifier comprised in the control signaling, wherein the BWP second configuration information comprises at least one of following information:
first state indication information, wherein the first state indication information is used to indicate a BWP state, and the BWP state comprises an activated state and a deactivated state;
first type indication information, wherein the first type indication information is used to indicate a BWP type, and the BWP type comprises a primary BWP and a secondary BWP.

4. The method according to claim 3, wherein the control signaling further comprises second state indication information, or comprises second type indication information, or comprises the second state indication information and the second type indication information;
the second state indication information is used to indicate a BWP state configured based on the state configuration indication; the second type indication information is used to indicate a BWP type configured based on the state configuration indication.

5. The method according to claim 4, wherein configuring, by the UE according to the control signaling, the second BWP configuration information indicated by the at least one BWP identifier comprised in the control signaling comprises:
configuring, by the UE according to the second state indication information, first state indication information indicated by the at least one BWP identifier comprised in the control signaling; or
configuring, by the UE according to the second type indication information, first type indication information indicated by the at least one BWP identifier comprised in the control signaling; or
configuring, by the UE according to the second state indication information and the second type indication information, the first state indication information and the first type indication information indicated by the at least one BWP identifier comprised in the control signaling.

6. The method according to claim 2, wherein activating the BWP corresponding to the BWP identifier comprised in the control signaling comprises at least one of:
   activating transmission of a sounding reference signal (SRS) on the BWP corresponding to the BWP identifier comprised in the control signaling;
   activating transmission of a channel quality reporting of the BWP corresponding to the BWP identifier comprised in the control signaling;
   activating monitoring of a physical downlink control channel (PDCCH), wherein the PDCCH is used to control the BWP corresponding to the BWP identifier comprised in the control signaling;
   activating monitoring of a PDCCH on the BWP corresponding to the BWP identifier comprised in the control signaling; and
   activating transmission of a physical uplink control channel (PUCCH) on the BWP corresponding to the BWP identifier comprised in the control signaling.

7. The method according to claim 2, wherein deactivating the BWP corresponding to the BWP identifier comprised in the control signaling comprises at least one of:
   deactivating transmission of a sounding reference signal (SRS) on the BWP corresponding to the BWP identifier comprised in the control signaling;
   deactivating transmission of a channel quality reporting of the BWP corresponding to the BWP identifier comprised in the control signaling;
   deactivating transmission of an uplink data channel on the BWP corresponding to the BWP identifier comprised in the control signaling;
   deactivating transmission of an uplink control channel on the BWP corresponding to the BWP identifier comprised in the control signaling;
   deactivating monitoring of a PDCCH, wherein the PDCCH is used to control the BWP corresponding to the BWP identifier comprised in the control signaling;
   deactivating monitoring of a PDCCH on the BWP corresponding to the BWP identifier comprised in the control signaling; and
   deactivating transmission of an uplink random access channel on the BWP corresponding to the BWP identifier comprised in the control signaling; and
   terminating a random access procedure initiated on the BWP corresponding to the BWP identifier comprised in the control signaling.

8. A User Equipment (UE), comprising:
   a storage, a processor and a computer program stored in the storage and executable by the processor, wherein in a case that the computer program is executed by the processor, the processor implements the frequency-band state processing method according to claim 1.

9. The UE according to claim 8, wherein, configuring, by the MAC layer or the RRC layer of the UE, the BWP state of the BWP corresponding to the BWP identifier comprised in the control signaling according to the state configuration indication and the first BWP configuration information comprises:
   activating, by the MAC layer or the RRC layer of the UE, the BWP corresponding to the BWP identifier comprised in the control signaling according to the activation indication; or
   deactivating, by MAC layer or the RRC layer of the UE, the BWP corresponding to the BWP identifier comprised in the control signaling according to the deactivation indication.

10. The UE according to claim 8, wherein, in a case that the computer program is executed by the processor, the processor further implements, after receiving, by the UE, the control signaling sent by the network device, following steps:
    configuring, by the UE according to the control signaling, second BWP configuration information indicated by the at least one BWP identifier comprised in the control signaling, wherein the second BWP configuration information comprises at least one of following information:
    first state indication information, wherein the first state indication information is used to indicate a BWP state, and the BWP state comprises an activated state and a deactivated state;
    first type indication information, wherein the first type indication information is used to indicate a BWP type, and the BWP type comprises a primary BWP and a secondary BWP.

11. The UE according to claim 10, wherein, the control signaling further comprises second state indication information, or comprises second type indication information, or comprises the second state indication information and the second type indication information;
    the second state indication information is used to indicate a BWP state configured based on the state configuration indication; the second type indication information is used to indicate a BWP type configured based on the state configuration indication.

12. The UE according to claim 11, wherein, configuring, by the UE according to the control signaling, the second BWP configuration information indicated by the at least one BWP identifier comprised in the control signaling comprises:
    configuring, by the UE according to the second state indication information, first state indication information indicated by the at least one BWP identifier comprised in the control signaling; or
    configuring, by the UE according to the second type indication information, first type indication information indicated by the at least one BWP identifier comprised in the control signaling; or
    configuring, by the UE according to the second state indication information and the second type indication information, the first state indication information and the first type indication information indicated by the at least one BWP identifier comprised in the control signaling.

13. The UE according to claim 9, wherein,
    activating the BWP corresponding to the BWP identifier comprised in the control signaling comprises at least one of:
    activating transmission of a sounding reference signal (SRS) on the BWP corresponding to the BWP identifier comprised in the control signaling;
    activating transmission of a channel quality reporting of the BWP corresponding to the BWP identifier comprised in the control signaling;
    activating monitoring of a physical downlink control channel (PDCCH), wherein the PDCCH is used to control the BWP corresponding to the MVP identifier comprised in the control signaling;

activating monitoring of a PDCCH on the BWP corresponding to the BWP identifier comprised in the control signaling; and activating transmission of a physical uplink control channel (PUCCH) on the BWP corresponding to the IMP identifier comprised in the control signaling;

or, deactivating the BWP corresponding to the BWP identifier comprised in the control signaling comprises at least one of:

deactivating transmission of a sounding reference signal (SRS) on the BWP corresponding to the BWP identifier comprised in the control signaling;

deactivating transmission of a channel quality reporting of the BWP corresponding to the BWP identifier comprised in the control signaling;

deactivating transmission of an uplink data channel on the BWP corresponding to the BWP identifier comprised in the control signaling;

deactivating transmission of an uplink control channel on the BWP corresponding to the BWP identifier comprised in the control signaling;

deactivating monitoring of a PDCCH, wherein the PDCCH is used to control the IMP corresponding to the BWP identifier comprised in the control signaling;

deactivating monitoring of a PDCCH on the BWP corresponding to the BWP identifier comprised in the control signaling; and deactivating transmission of an uplink random access channel on the MVP corresponding to the BWP identifier comprised in the control signaling; and terminating a random access procedure initiated on the BWP corresponding to the BWP identifier comprised in the control signaling.

14. The method according to claim 1, wherein the IMP configuration information further comprises at least one BWP type corresponding to the at least one BWP identifier.

15. The UE according to claim 8, wherein the BWP configuration information further comprises at least one BWP type corresponding to the at least one BWP identifier.

16. A frequency-band state processing method, comprising:

sending, by a network device, first bandwidth part (BWP) configuration information to user equipment (UE), wherein the first BWP configuration information comprises at least one BWP identifier, and at least one BWP initial state corresponding to the at least one BWP identifier, wherein the BWP initial state comprises an activated state and a deactivated state;

generating, by the network device, control signaling; wherein the control signaling comprises at least one bandwidth part (BWP) identifier and a state configuration indication, the state configuration indication comprises an activation indication or a deactivation indication, and the first BWP configuration information and the state configuration indication are used to indicate that a Media Access Control (MAC) layer or an RRC layer of the UE configures a BWP state of a BWP corresponding to the BWP identifier comprised in the control signaling;

sending, by the network device, the control signaling to a physical layer of the UE.

17. The method according to claim 16, wherein the control signaling further comprises second state indication information, or comprises second type indication information, or comprises the second state indication information and the second type indication information;

wherein the second state indication information is used to indicate a BWP state configured based on the state configuration indication; the second type indication information is used to indicate a BWP type configured based on the state configuration indication.

18. A network device, comprising:

a storage, a processor and a computer program stored in the storage and executable by the processor, wherein in a case that the computer program is executed by the processor, the processor implements the frequency-band state processing method according to claim 16.

19. The network device according to claim 18, wherein, the control signaling further comprises second state indication information, or comprises second type indication information, or comprises the second state indication information and the second type indication information; wherein the second state indication information is used to indicate a BWP state configured based on the state configuration indication; the second type indication information is used to indicate a IMP type configured based on the state configuration indication.

20. The method according to claim 16, wherein the BWP configuration information further comprises at least one BWP type corresponding to the at least one BWP identifier.

* * * * *